United States Patent [19]

Makishima

[11] 4,238,087
[45] Dec. 9, 1980

[54] SAFETY SEAT BELT RETRACTOR

[75] Inventor: Yoshihiro Makishima, Yokohama, Japan

[73] Assignee: NSK-Warner K.K., Tokyo, Japan

[21] Appl. No.: 49,111

[22] Filed: Jun. 18, 1979

[30] Foreign Application Priority Data

Jul. 4, 1978 [JP] Japan ................................. 53-91403
Nov. 21, 1978 [JP] Japan ................................ 53-159385

[51] Int. Cl.³ ...................... A62B 35/02; B65H 75/48
[52] U.S. Cl. ............................................. 242/107.4 A
[58] Field of Search ................ 242/107.4 A, 107.4 B; 280/802–808; 297/478, 480; 188/135, 139

[56] References Cited

U.S. PATENT DOCUMENTS

| | | | |
|---|---|---|---|
| 3,790,098 | 2/1974 | Lewis | 242/107.4 A |
| 3,819,126 | 6/1974 | Stoffel | 242/107.4 A |
| 3,926,384 | 12/1975 | Weman | 242/107.4 A |
| 4,007,802 | 2/1977 | Rosa | 242/107.4 A X |

Primary Examiner—John M. Jillions
Attorney, Agent, or Firm—Shapiro and Shapiro

[57] ABSTRACT

A safety seat belt retractor provided with an inertia sensing member capable of sensing a predetermined speed variation or tilting of a vehicle body and assuming a first position of normal state and a second position corresponding to said predetermined speed variation or tilting, the inertia sensing member being continuously displaceable from said first position to said second position to, and lock means for preventing draw-out of webbing to restrain a seat occupant when said inertia sensing member is displaced to said second position. The inertia sensing member is designed to be brought to said second position by the attraction of a magnet when said inertia sensing member has been displaced by a predetermined amount from said first position.

5 Claims, 6 Drawing Figures

SAFETY SEAT BELT RETRACTOR

BACKGROUND OF THE INVENTION

1. Field of the Invention

This invention relates to a safety seat belt retractor provided with an inertia sensing member capable of sensing a predetermined speed variation or tilting of a vehicle body and capable of assuming a first position of stable state and a second position corresponding to said predetermined speed variation or tilting and being continuously displaceable from said first position to said second position to restrain a seat occupant.

2. Description of the Prior Art

In a lock mechanism for directly sensing a sudden speed variation of a vehicle body due to collision or the like or tilting of the vehicle body on a sloping road or the like and for preventing draw-out of webbing from a safety seat belt retractor to restrain a seat occupant, it is well-known to use an inertia sensing member as the means for sensing the speed variation or tilting of the vehicle body. As such an inertia sensing member, there is well-known the pendulum type which utilizes the swing of a pendulum, the ball type which utilizes the displacement of a ball member, or the upright type in which an inertia member kept upright is caused to fall down. In the case of the upright type inertia sensing member, the critical value at which the inertia member falls down is clear and there is an advantage in that the operating force resulting from the action of falling down is great, whereas in the case of the pendulum type or the ball type sensing member, the swing (namely, displacement) of the pendulum or the displacement of the ball is continuous. These types have a disadvantage in that it is difficult to determine the critical value of their operation and the operating force is smaller, being in inverse proportion to the amount of displacement.

SUMMARY OF THE INVENTION

It is an object of the present invention to eliminate the above-noted disadvantages peculiar to the pendulum type or the ball type inertia sensing member which is continuously operable.

According to the present invention, a safety seat belt retractor provided with an inertia sensing member capable of sensing a predetermined speed variation or tilting of a vehicle body and of assuming a first position of normal state and a second position corresponding to said predetermined speed variation or tilting and being continuously displaceable from said first position to said second position to restrain a seat occupant is designed to be brought to said second position by the attraction of a magnet when said inertia sensing member has been displaced by a predetermined amount from said first position.

Other objects and features of the present invention will become fully apparent from the following detailed description of preferred embodiments thereof taken in conjunction with the accompanying drawings.

DESCRIPTION OF THE PREFERRED EMBODIMENTS

Figure 1:
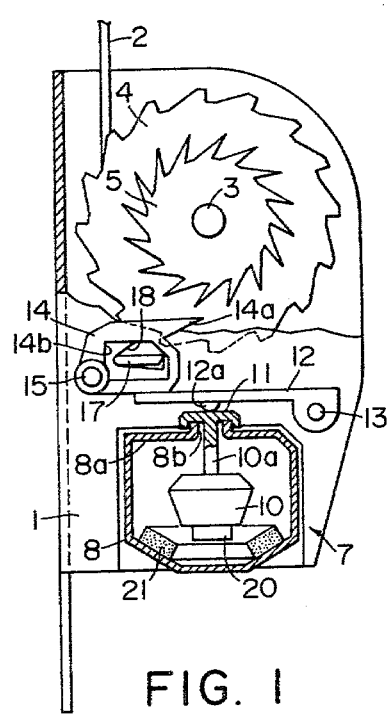
FIG. 1 is a side view of a first embodiment of the present invention partly cut away and partly in cross-section showing the pendulum in a first position.
Figure 2:
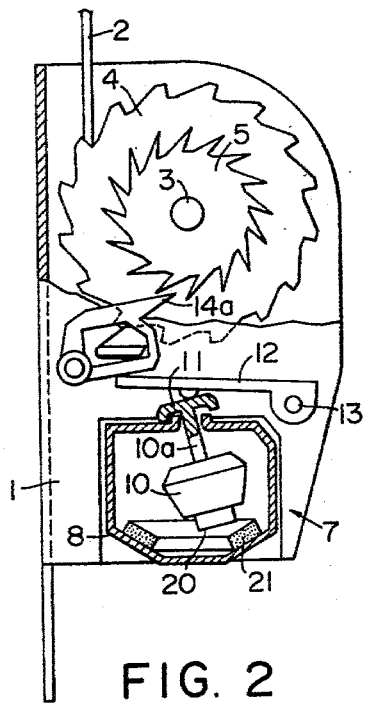
FIG. 2 is a view similar to FIG. 1 but showing the pendulum in a second position.
Figure 3:
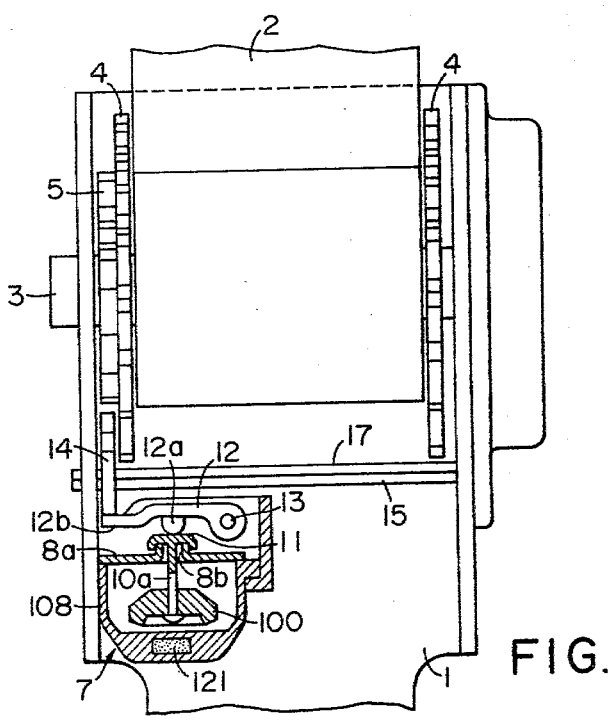
FIG. 3 is a partly cut-away schematic front view of a second embodiment showing the pendulum in a first position of normal state.
Figure 4:
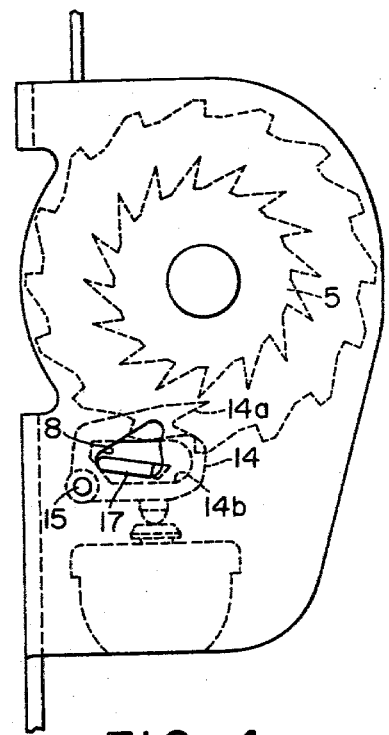
FIG. 4 is a schematic left-hand side view of the second embodiment.
Figure 5:
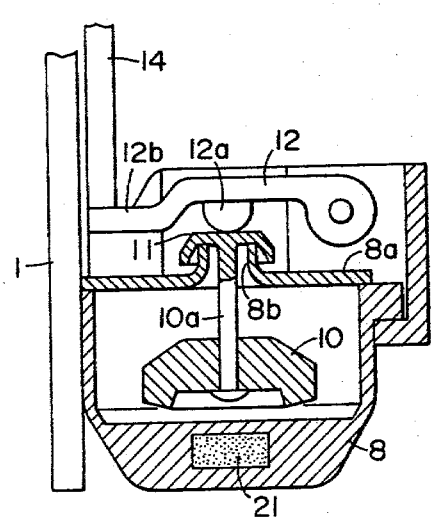
FIG. 5 is an enlarged partial view of the second embodiment with the inertia sensor portion cut away.
Figure 6:
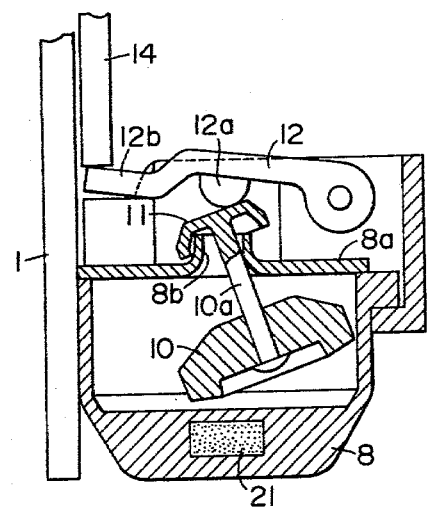
FIG. 6 is an enlarged view of a portion of FIG. 3 showing the pendulum of the second embodiment in tilted state.

FIGS. 1 and 2 are partly cut-away schematic side views of a safety seat belt retractor as seen from the left side thereof. Reference numeral 1 designates a base. A take-up shaft 3 for webbing 2 is rotatably provided on the base 1 and biased in take-up direction, as is well-known. A main gear 4 and an auxiliary gear 5 are securely mounted on the take-up shaft 3.

An inertia sensor device 7 is attached to the base 1 below the take-up shaft 3. The inertia sensor device 7 has a case 8 of non-magnetic material such as plastics or the like secured to the base 1. A pendulum which is an inertia sensing member 10, is swingably suspended through a hole 8b formed at the center of the upper surface 8a of the case 8. The pendulum 10 has a rod 10a upwardly projected symmetrically with respect to the vertical center axis and extending through the central hole 8b in the upper surface 8a of the case, and has an integral flange-like dish-shaped portion 11 above the upper surface 8a of the case. The pendulum 10 may be tilted from its stable position of FIG. 1 relative to the base in response to any variation in speed of a vehicle body. Above the case 8, a lever 12 is supported by a pivot member 13 for pivotal movement relative to the base 1. A downwardly facing projection 12a is formed on the underside of the substantially central portion of the lever 12, and this projection 12a rests on the dish-shaped portion 11 of the pendulum 10. Slightly above the tip end of the lever 12, a ratchet lever 14 is supported by a pivot pin 15 for pivotal movement relative to the base 1. The ratchet lever 14 has its underside resting on the tip end of the lever 12, and may be rotated counterclockwise by clockwise rotation of the lever 12 caused by the tilting of the pendulum 10 and, accordingly, the dish-shaped portion 11. At that time, a ratchet pawl 14a formed on the ratchet lever 14 is brought into meshing engagement with the auxiliary gear 5 on the take-up shaft side. An axially open large hole 14b is formed in the central portion of the ratchet lever 14 and a main pawl member 17 axially provided in the base 1 extends through the hole 14b. The main pawl member 17 is placed in a sector-shaped hole 18 formed in the base 1 so as to be capable of assuming meshing position and non-meshing position with the main gear 4 on the take-up shaft side, and is normally in the non-meshing position shown in FIG. 1, with the aid of a spring, not shown, or gravity.

In the above-described type of construction, the pendulum 10 is continuously gradually tilted and displaced in response to a variation in speed of the vehicle body and moreover, as the amount of displacement is increased, the force with which the lever 12 is raised and pivoted is decreased. Therefore, in the present embodiment of the present invention, a permanent magnet disc 20 is secured to the bottom of the pendulum of non-magnetic material while, on the other hand, an iron ring 21 is secured to the bottom of the case 8 so that the center axis of the pendulum 10 in its vertical position is the center line of the ring. The intensity of the magnetic force of the permanent magnet 20 is selected to be sufficient so that when the pendulum 10, which is an inertial body, is displaced by a predetermined amount by a predetermined speed variation of the vehicle body due to its collision or sudden braking, the pendulum 10 is further displaced by the magnetic force to bring the ratchet lever 14a into meshing engagement with the auxiliary gear 5 through the lever 12. That is, the magnet 20 is for assisting the movement of the pendulum 10. Of course, the same effect may be obtained by attaching a magnetic member, instead of the permanent magnet, to the pendulum and making the iron ring into a permanent magnet.

While a pendulum type inertia sensing member has been illustratively shown in the foregoing embodiment, a ball type inertia sensing member may also be used.

FIGS. 3 to 6 show a second embodiment of the present invention. In FIGS. 3 to 6, structural portions similar to those of the first embodiment are given reference characters similar to those in the first embodiment and need not be described. Description will hereinafter be made of only the structural portions which differ from those of the first embodiment.

A pendulum 100 is formed of a magnetic material while, on the other hand, a circular permanent magnet 121 is secured to the bottom of a case 108 so that the center axis of the pendulum 100 in its vertical position is the center line of the magnet. The intensity of the magnetic force of the permanent magnet 121 and the shape of the pendulum 100 are selected to be sufficient so that when the pendulum 100 which is an inertial body is displaced by a predetermined amount by a predetermined speed variation of the vehicle body due to its collision or sudden braking, the pendulum 100 is further displaced by the magnetic force to bring the ratchet lever 14a into meshing engagement with the auxiliary gear 5 through the lever 12. That is, the permanent magnet 121 is for assisting the movement of the pendulum 100. Of course, the same effect may be obtained by attaching a ring-shaped or other suitably shaped magnetic member to the bottom of the pendulum instead of making the entire pendulum into a magnetic member.

While a pendulum type inertia sensing member has been illustratively shown in the foregoing embodiment, a ball type inertia sensing member may also be used.

According to the present invention, the use of a magnet eliminates the disadvantage of the conventional pendulum or ball type inertia sensing member and enables a desired predetermined speed variation value to be set accurately and can provide an inertia sensor having a greater operating force.

What I claim is:

1. A safety seat belt retractor comprising an inertia sensing member capable of sensing a predetermined speed variation or tilting of a vehicle body and of assuming a first position of stable state and a second position corresponding to said predetermined speed variation or tilting and being continuously displaceable from said first position to said second position; means for locking the retractor when said inertia sensing member is displaced to said second position, and a magnet having such an attraction that said inertia sensing member is brought to said second position when said inertia sensing member has been displaced by a predetermined amount from said first position.

2. The system according to claim 1, wherein said magnet is a permanent magnet.

3. The system according to claim 1, wherein said inertia sensing member comprises a pendulum, and the state of said pendulum being vertically suspended corresponds to said first position, and wherein said magnet comprises a magnet disc attached to said pendulum, and a magnetic ring is provided below said pendulum with the center line of said pendulum during its vertical state as the center of the magnetic ring.

4. The system according to claim 3, wherein the magnetic ring is a permanent magnet.

5. The system according to claim 1, wherein said inertia sensing member comprises a pendulum, and the state of said pendulum being vertically suspended corresponds to said first position, said pendulum at least partly including a magnetic material, and wherein said magnet comprises a permanent magnet of circular cross-section provided below said pendulum with the center line of said pendulum during its vertical state as the center of the magnet.

* * * * *